Nov. 23, 1926.  1,607,707
H. A. TOULMIN, JR
LIQUID LEVEL GAUGE
Filed Nov. 12, 1921
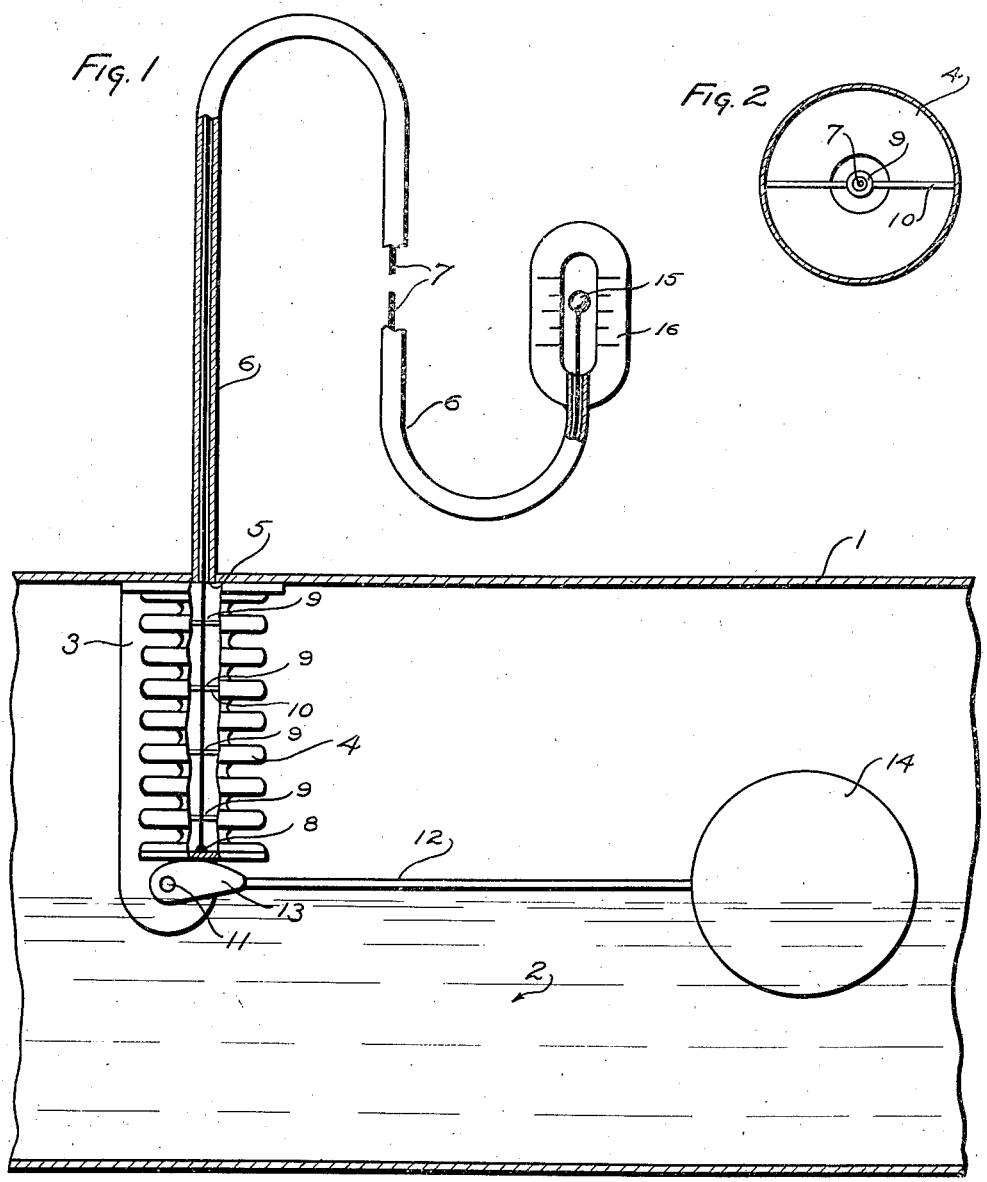

Patented Nov. 23, 1926.

1,607,707

UNITED STATES PATENT OFFICE.

HARRY A. TOULMIN, JR., OF DAYTON, OHIO, ASSIGNOR TO THE GROLAN MANUFACTURING COMPANY, OF DAYTON, OHIO, A CORPORATION OF DELAWARE.

LIQUID-LEVEL GAUGE.

Application filed November 12, 1921. Serial No. 514,478.

My invention relates to gauges for indicating the level of liquids in tanks.

The object of my invention is to provide a gauge which will indicate the level of liquids in tanks.

It is also my object to provide a gauge with a means of communication between the actuator and the indicator which may be adapted to any desired angle or curve and which may be used in locations where it will be subject to the influence of oil, gasoline, water, and other agencies.

Referring to the drawings:

Fig. 1 is a side elevation, partially in section, of a tank with my gauge installed therein;

Fig. 2 is a sectional plan view of a portion of the bellows mechanism with its guiding rings to guide the actuating element.

Referring to the drawings, 1 is a tank in which the liquid 2 is contained. In this tank is suspended from a bracket 3 a bellows 4, or bellows-like expansible and contractible vessel, preferably made of metal which is adapted to be compressed and return of its own volition to its original dimensions. In other words, the upper end of the bellows-like compressible and contractible vessel is attached to the top wall of the tank through the medium of the bracket. The bracket 3 may be attached to the tank 1 by brazing, soldering, riveting or in any other suitable manner. The bellows 4 is air tight and will not permit of the exit of any liquid in the tank out of it through the bellows, but the interior of the bellows communicates at 5 with a pipe or guide 6 in which travels an actuating element, preferably a piano wire 7. This piano wire is fastened at 8 by brazing or soldering or in any other suitable manner to the bottom of the bellows and is guided by the casing 6. It is also guided by the rings 9 that are supported on the cross members 10 in the bellows.

Pivoted at the bottom of the bracket 3 at 11 is a lever 12 carrying a cam 13 which engages with the bottom of the bellows to compress it when the lever 12 is lifted by the float 14 riding on the upper portion of the liquid in the tank.

At the outer end of the actuating element 7 is a gauge of any desired character to indicate the height of the liquid in the tank. In this instance I have employed an indicating ball 15 and a scale 16. It is obvious that any form of gauge or scale may be used.

I do not desire to confine myself to any particular form of mechanical adaptation of my invention, but I have shown a preferred form in that illustrated by my drawings.

While I have shown and described certain features as constituting my invention, it will be understood that parts have been shown for purposes of illustration only, and that I do not desire to be limited to such details, as obvious modifications may occur to those skilled in the art.

Having set forth the invention, what is claimed is—

1. In a device for the purpose indicated, the combination with a liquid containing tank, of an extensible and contractible vessel within the tank and attached thereto at its upper end, means actuated by the rise and fall of the liquid in the tank to raise and lower the lower end of the vessel, a flexible wire-like member attached to the lower end of the vessel to move therewith, said flexible wire-like member extending to a point remote from the outside of the vessel and adapted to indicate by the position of its remote end the liquid level in the tank.

2. In a device for the purpose indicated, the combination with a liquid containing tank, of an expansible and contractible vessel depending from the top of and extending within the tank, means for attaching the upper end of the vessel to the tank, said means comprising a depending support, a cam on the lower end of the support and engageable with the lower end of the support and engageable with the lower end of the vessel, means carried by the cam and actuated by the rise and fall of the liquid level in the tank to move the cam which, in turn, raises and lowers the lower end of the vessel, a flexible wire-like member attached to the lower end of the vessel to move therewith, said flexible member having its remote end extending a substantial distance from the outside of the vessel and adapted to indicate by the position of the remote end the liquid level in the tank.

3. In a device for the purpose indicated, the combination with a liquid containing tank, of an expansible and contractible vessel, means for attaching the upper end of the vessel to the upper wall of the tank whereby the vessel may depend within the tank, said attaching means including a depending element, a cam fulcrumed upon the depending element and engageable with the lower end of the vessel, means attached to the cam and adapted to be actuated by the rise and fall of the liquid level in the tank to maintain the cam in contact with and to raise and lower the lower end of the vessel, a flexible wire-like member passing through the vessel with one end attached to the lower end of the vessel to move therewith, and having its other end extending to a point remote from the outside of the vessel and adapted by the position of the remote end to indicate the quantity of liquid in the tank, means within the vessel to guide the wire-like member, and a scale with which the remote end of the wire-like member cooperates to indicate the liquid level in the tank.

In testimony whereof, I affix my signature.

HARRY A. TOULMIN, Jr.